(12) United States Patent
Tateno

(10) Patent No.: US 11,392,412 B2
(45) Date of Patent: Jul. 19, 2022

(54) ENGINEERING TOOL, CONTROLLER, AND CONTROL SYSTEM

(71) Applicants: KABUSHIKI KAISHA TOSHIBA, Minato-ku (JP); TOSHIBA INFRASTRUCTURE SYSTEMS & SOLUTIONS CORPORATION, Kawasaki (JP)

(72) Inventor: Genki Tateno, Hino (JP)

(73) Assignees: KABUSHIKI KAISHA TOSHIBA, Minato-ku (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 156 days.

(21) Appl. No.: 16/976,589

(22) PCT Filed: Sep. 11, 2018

(86) PCT No.: PCT/JP2018/033696
§ 371 (c)(1),
(2) Date: Aug. 28, 2020

(87) PCT Pub. No.: WO2019/167316
PCT Pub. Date: Sep. 6, 2019

(65) Prior Publication Data
US 2021/0004254 A1    Jan. 7, 2021

(30) Foreign Application Priority Data
Mar. 1, 2018    (JP) .............................. JP2018-036820

(51) Int. Cl.
*G06F 9/50*    (2006.01)
*G06F 9/455*    (2018.01)
(Continued)

(52) U.S. Cl.
CPC ............... *G06F 9/50* (2013.01); *G05B 15/00* (2013.01); *G05B 15/02* (2013.01); *G06F 9/455* (2013.01);
(Continued)

(58) Field of Classification Search
None
See application file for complete search history.

(56) References Cited

U.S. PATENT DOCUMENTS

2009/0089780 A1    4/2009 Johnson et al.
2013/0275975 A1   10/2013 Masuda et al.
2017/0068235 A1    3/2017 Manabe et al.

FOREIGN PATENT DOCUMENTS

WO    WO 2012/056731 A1    5/2012
WO    WO 2015/137505 A1    9/2015
(Continued)

OTHER PUBLICATIONS

International Search Report dated Nov. 6, 2018 in PCT/2018/033696 filed Sep. 11, 2018, citing documents AB and AQ-AR therein, 1 page.

*Primary Examiner* — Qing Yuan Wu
(74) *Attorney, Agent, or Firm* — Oblon, McClelland, Maier & Neustadt, L.L.P.

(57) ABSTRACT

An engineering tool includes a hardware-allocation-data storage, an allocation-condition storage, and a tool processor. Hardware allocation data is to be downloaded to a controller that executes a host operating system (OS), and represents hardware allocation to each of the host OS and a guest OS that runs on a virtual machine implemented on the host OS. The allocation-condition storage stores therein hardware allocation conditions for the host OS and the guest OS. The tool processor causes a display to display a settings screen for inputting the hardware allocation data; after determining that the input hardware allocation data satisfies (Continued)

the allocation conditions stored in the allocation-condition storage, saves the input hardware allocation data in the hardware-allocation-data storage; and after determining that the input hardware allocation data fails to satisfy the allocation conditions, refrains from saving the input hardware allocation data therein.

3 Claims, 6 Drawing Sheets

(51) Int. Cl.
*G05B 15/02* (2006.01)
*G05B 15/00* (2006.01)

(52) U.S. Cl.
CPC ........ *G06F 9/45558* (2013.01); *G06F 9/5061* (2013.01); *G06F 9/5077* (2013.01)

(56) References Cited

FOREIGN PATENT DOCUMENTS

| WO | WO 2016/189689 A1 | 12/2016 |
| WO | WO 2018/154967 A1 | 8/2018 |

ENGINEERING TOOL, CONTROLLER, AND
CONTROL SYSTEM

CROSS-REFERENCE TO RELATED
APPLICATIONS

This application is a national stage application of International Application No. PCT/JP2018/033636, filed Sep. 11, 2018, which designates the United States, and which claims the benefit of priority from Japanese Patent Application No. 2018-036820, filed Mar. 1, 2018, the entire contents of each of which are incorporated herein by reference.

FIELD

Embodiments described herein generally relate to an engineering tool, a controller, and a control system.

BACKGROUND

Server virtualization technology is known, which refers to logically partitioning a single computer to allow a plurality of operating systems (OS) to run on the computer. By applying server virtualization to a control system that controls an intended device, such as a valve in a plant, a human machine interface (HMI), an engineering tool, and a controller can be consolidated into one computer. This can bring promising effect of large cost savings in terms of equipment installation and electricity and air conditioning in a control system.

Meanwhile, A guest OS runs on a virtual machine implemented on the host OS of the computer. To apply server virtualization to the control system, the virtual machine is to be initiated by allocating the hardware to the guest OS on the basis of hardware allocation data that is set by an engineer with an engineering tool. In doing so, with occurrence of error in the setting of the hardware allocation data, however, the control system may fail to function properly.

DETAILED DESCRIPTION

According to an embodiment, in general, an engineering tool includes a hardware-allocation-data storage, an allocation-condition storage, and a tool process unit. The hardware-allocation-data storage stores therein hardware allocation data to be downloaded to a controller that executes a host operating system. The hardware allocation data represents hardware allocation to each of the host operating system and a guest operating system that runs on a virtual machine implemented on the host operating system. The allocation-condition storage stores therein hardware allocation conditions for the host operating system and the guest operating system. The tool process unit causes a display to display a settings screen for inputting the hardware allocation data; after determining that the hardware allocation data input to the settings screen satisfies the allocation conditions stored in the allocation-condition storage, saves the input hardware allocation data in the hardware-allocation-data storage; and after determining that the input hardware allocation data fails to satisfy the allocation conditions, refrains from saving the input hardware allocation data in the hardware-allocation-data storage.

An engineering tool, a controller, and a control system according to embodiments will be described below with reference to the accompanying drawings.

First Embodiment

Figure 1:
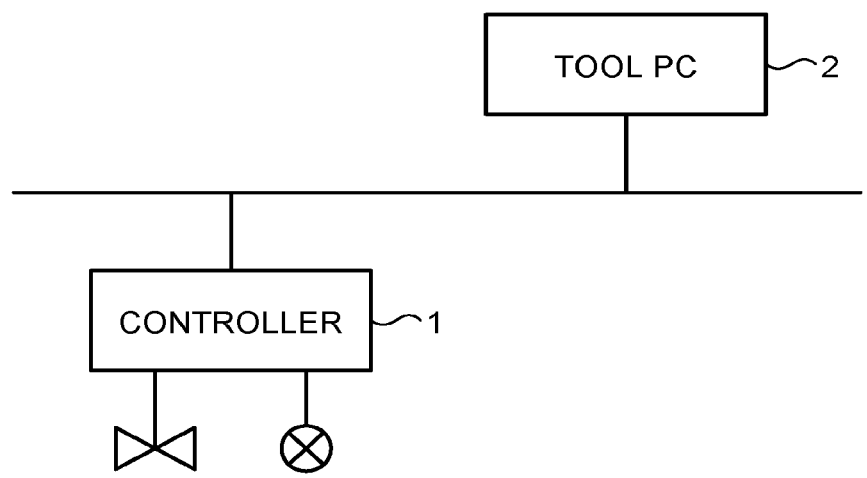
FIG. 1 is a view illustrating an exemplary functional configuration of a control system according to a first embodiment.

FIG. 1 is a view illustrating an exemplary functional configuration of a control system according to a first embodiment. As illustrated in FIG. 1, the control system of the present embodiment includes a controller 1 and a tool PC 2 (an exemplary engineering tool). The controller 1 and the tool PC 2 are connected to each other in a communicable manner through a network, such as a local area network (LAN). In the present embodiment, the tool PC 2's transmitting a variety of information to the controller 1 is referred to as downloading (D/L). The tool PC 2's receiving a variety of information from the controller 1 is referred to as uploading (U/L).

The tool PC 2 represents an engineering tool for use by vendors or engineers, for example, and stores therein a program organization unit (POU), later-described hardware allocation data (tool data), and other data. The POU refers to modularized programs in units of function for the purpose of executing processing in the entire control system.

The controller 1 receives results of a variety of detection from sensors, for example, in a plant. The controller 1 has downloaded thereto a POU created in the tool PC 2. The controller 1 executes the POU on an internal task. In this manner, the controller 1 performs a computation based on the results of detection, and controls a target device in the plant, such as a valve, on the basis of a result of the computation.

The controller 1 includes logically partitioned resources (hardware) and operates a plurality of operating systems (OS) to consolidate external devices involved in controlling the target device, such as a human machine interface (HMI) of the control system and another controller. The operator of the control system uses the HMI to monitor the state of the POU remotely executed by the controller 1 and to perform a variety of operations, such as writing variables to the controller 1 and altering the POU.

Figure 2:
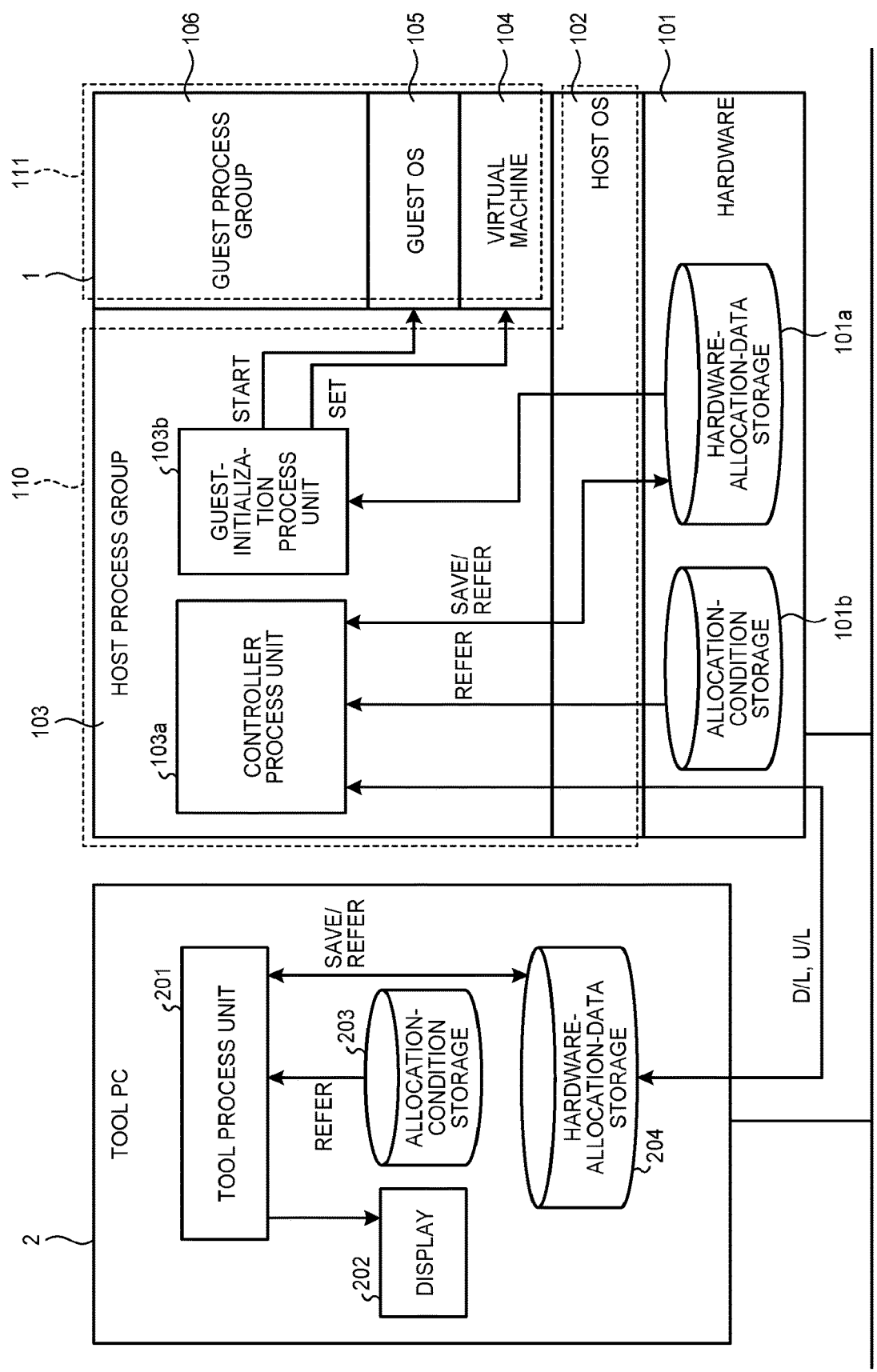
FIG. 2 is a view illustrating an exemplary functional configuration of a controller and a tool PC of the control system of the first embodiment.

FIG. 2 is a view illustrating an exemplary functional configuration of the controller and the tool PC of the control system in the first embodiment. As illustrated in FIG. 2, the controller 1 includes hardware 101, a host OS 102, a host process group 103, a virtual machine 104, a guest OS 105, a guest process group 106. The hardware 101 represents, for example, a processor such as a central processing unit (CPU), memories such as read-only memory (ROM) and random access memory (RA), and a LAN port, a universal serial bus (USB) port, and a peripheral component interconnect (PCI) slot used in communications with external devices such as the tool PC 2.

In the present embodiment, the controller 1 serves as a multi-core processor including a plurality of CPU cores (for example, four CPU cores) as the hardware 101, to execute software on the CPU cores. Specifically, the controller 1 causes one of the CPU cores to execute a single OS (the host OS 102) to operate a plurality of mutually isolated containers 110 and 111. In doing so, the controller 1 causes different CPU cores to operate the containers 110 and 111. In the present embodiment, the controller 1 causes different CPU cores to operate the container 110 including the host OS 102 and the host process group 103, and the container 111 including the virtual machine 104, the guest OS 105, and the guest process group 106, as illustrated in FIG. 2.

The host OS 102 serves as an OS for implementing an external device (the virtual machine 104) to be virtualized by the controller 1. The host process group 103 includes an application that runs on the host OS 102. The virtual machine 104 is implemented on the host OS 102. In the present embodiment, the virtual machine 104 represents a virtualized machine of hardware of an external device, such as an HMI or another controller. Herein, virtualization includes emulation of the hardware of the external device. The guest OS 105 runs on the virtual machine 104 and serves to operate a computer program (guest process group 106, as will be described later) of the external device. The guest process group 106 runs by the guest OS 105, and serves to execute processing involving in controlling the target device (hereinafter referred to as control processing), using the hardware 101 allocated to the guest OS 105 in accordance with later-described hardware allocation data. Herein, in the case of using the virtual machine 104 being a virtualized HMI, the control processing includes processing involving in monitoring the control system and remotely operating the control system to perform a process. In the case of using the virtual machine 104 being virtualization of another controller, the control processing includes controlling the target device, for example, by transmitting control data to the target device.

In the present embodiment, the host process group 103 includes a controller process unit 103a. The controller process unit 103a is operated by the host OS 102 without the guest OS 105. The controller process unit 103a downloads and executes a POU from the tool PC 2. Also, the controller process unit 103a downloads hardware allocation data from the tool PC 2, to execute the control processing to the target device, using the hardware 101 allocated to the host OS 102 in accordance with the hardware allocation data. Herein, the hardware allocation data represents allocation of the hardware 101 to each of the host OS 102 and the guest OS 105. Specifically, in response to power-on of the controller 1, the controller process unit 103a validates the hardware allocation data, and uses the hardware 101 allocated to the host OS 102 indicated by the hardware allocation data, to control the target device. The controller process unit 103a saves the downloaded hardware allocation data in a hardware-allocation-data storage 101a serving as a nonvolatile storage of the hardware 101, such as a hard disk drive (HDD).

In view of managing engineering data in the control system, it is preferable to manage the hardware 101 allocated to the guest OS 105 in accordance with the hardware allocation data. For this reason, in the present embodiment the host process group 103 includes a guest-initialization process unit 103b, in addition to the controller process unit 103a. Upon power-on of the controller 1, the guest-initialization process unit 103b allocates the hardware 101 to the guest OS 105, referring to the hardware allocation data stored in the hardware-allocation-data storage 101a, and also sets, on the host OS 102, the virtual machine 104 being virtualization of the external device. Further, the guest-initialization process unit 103b initiates the guest OS 105 on the virtual machine 104. Thereby, the hardware 101 becomes allocable to the guest OS 105 that runs on the virtual machine 104 in the same or like manner as the hardware 101 is allocated to the host OS 102. As a result, a single controller 1 into which external devices such as an HMI and another controller are consolidated can easily manage the allocation of the hardware 101 to the guest OS 105 in response to an update of the hardware 101.

With occurrence of error in the hardware allocation data downloaded from the tool PC 2, however, the controller 1 cannot properly allocate the hardware 101 to the host OS 102 and the guest OS 105 on the basis of the hardware allocation data concerned, which may undesirably affect the controller 1. For example, when a larger memory capacity than the memory capacity of the hardware 101 is allocated to the guest OS 105 in accordance with the downloaded hardware allocation data, the CPU core of the controller 1 may not be able to execute the guest OS 105, which may lead to a failure in causing the virtual machine 104 to function as an HMI.

In the present embodiment, the controller 1 includes an allocation-condition storage 101b including a nonvolatile storage of the hardware 101, such as an HDD. The allocation-condition storage 101b stores therein allocation condition data. The allocation condition data represents individual hardware allocation conditions 101 for the host OS 102 and the guest OS 105. Having the hardware allocation data downloaded from the tool PC 2, the controller process unit 103a determines whether the downloaded hardware allocation data satisfies the allocation condition data stored in the allocation-condition storage 101b. After determining that the downloaded hardware allocation data satisfies the allocation condition data, the controller process unit 103a saves the downloaded hardware allocation data in the hardware-allocation-data storage 101a. Meanwhile, after determining that the downloaded hardware allocation data fails to satisfy the allocation condition data, the controller process unit 103a refrains from saving the downloaded hardware allocation data in the hardware-allocation-data storage 101a. This can prevent the hardware 101 from being allocated to the host OS 102 and the guest OS 105 in accordance with erroneous hardware allocation data downloaded from the tool PC 2 and can reduce the possibility of undesirably affecting the controller 1. Additionally, in response to an engineer's instruction through an operation of the tool PC 2 to upload hardware allocation data, the tool PC 2 uploads the hardware allocation data from the hardware-allocation-data storage 101a.

A functional configuration of the tool PC 2 will be described next. As illustrated in FIG. 2, the tool PC 2 includes a tool process unit 201, a display 202, an allocation-condition storage 203, and a hardware-allocation-data storage 204. The hardware-allocation-data storage 204 stores therein hardware allocation data for each model of the controller 1 or for each network address (for example, an IP address) of the controller 1. The allocation-condition storage 203 stores therein allocation-condition data for each model of the controller 1 or for each network address (for example, IP address) of the controller 1.

The tool process unit 201 controls the entire tool PC 2. In the present embodiment, the tool PC 2 is equipped with hardware including a processor such as a CPU, and memory such as ROM and RAM. The processor executes a computer program stored in the memory, thereby implementing the tool process unit 201. However, the tool process unit 201 is not limited thereto, and may be implemented by circuitry.

Specifically, the tool process unit 201 causes the display 202 to display a settings screen for entering hardware allocation data. The tool process unit 201 also determines whether the hardware allocation data input to the settings screen satisfies the allocation condition data stored in the allocation-condition storage 203. After determining that the hardware allocation data satisfies the allocation condition data, the tool process unit 201 saves the hardware allocation data in the hardware-allocation-data storage 204. After determining that the hardware allocation data fails to satisfy the allocation condition data, the tool process unit 201 refrains from saving the hardware allocation data in the hardware-allocation-data storage 204. In this manner, the hardware 101 can be prevented from being erroneously allocated to the host OS 102 and the guest OS 105 in accordance with the hardware allocation data to be downloaded to the controller 1, which can reduce the possibility of exerting undesirable influence on the controller 1.

Thereafter, in response to an engineer's, being the user of the tool PC 2, selection of hardware allocation data and instruction for downloading the data, the tool process unit 201 downloads, to the controller 1, the selected hardware allocation data from the hardware allocation data stored in the hardware-allocation-data storage 204. Thereby, the engineer is able to manage, with the tool PC 2, the hardware allocation to the guest OS 105 that runs on the virtual machine 104 of the controller 1. After receiving an instruction for uploading hardware allocation data from the engineer being the user of the tool PC 2, the tool process unit 201 uploads the hardware allocation data from the controller 1 and saves that in the hardware-allocation-data storage 204.

Figure 3:
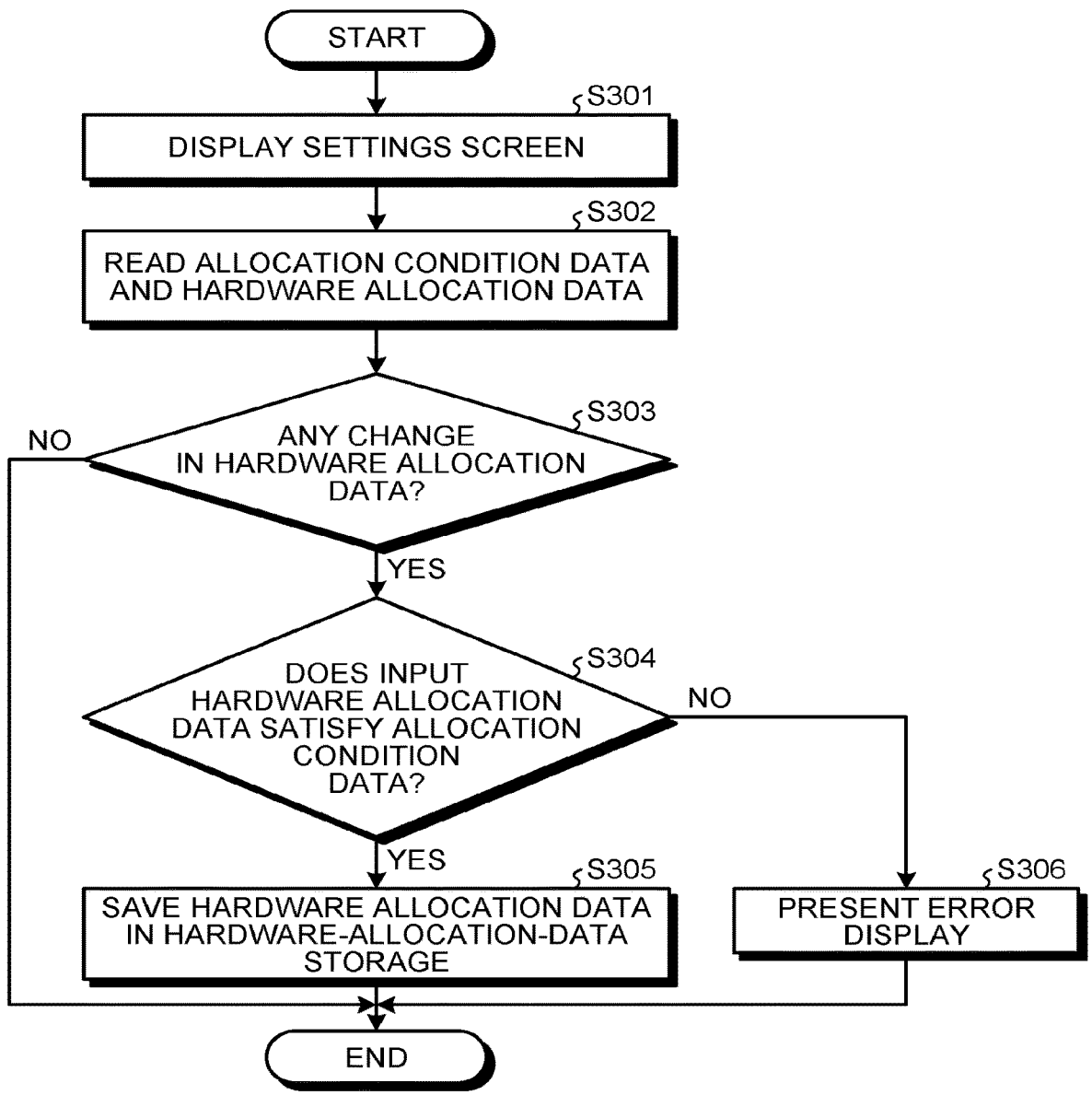
FIG. 3 is a flowchart illustrating exemplary hardware-allocation-data setting processing performed by the tool PC in the first embodiment.

FIG. 3 is a flowchart illustrating exemplary hardware-allocation-data setting processing performed by the tool PC in the first embodiment. The tool process unit 201 causes the display 202 to display the settings screen for inputting hardware allocation data (Step S301). In the present embodiment, the tool process unit 201 causes the display 202 to display the settings screen showing default hardware allocation data. The tool process unit 201 then reads the allocation condition data from the allocation-condition storage 203 in accordance the model or the network address of the controller 1 instructed by the user (engineer) of the tool PC 2 (Step S302). The tool process unit 201 also reads the hardware allocation data from the hardware-allocation-data storage 204 in accordance with the model or the network address of the controller 1 instructed by the user of the tool PC 2 (Step S302).

Subsequently, the tool process unit 201 compares the hardware allocation data input onto the settings screen and the hardware allocation data read from the hardware-allocation-data storage 204, to determine whether there is a change in the hardware allocation data (Step S303). In the present embodiment, upon every input of one item of hardware allocation data to the settings screen, the tool process unit 201 compares the hardware allocation data input to the settings screen and the read hardware allocation data, to determine whether there is a change in the hardware allocation data. However, how to compare the data and determine a change is not limited thereto. For example, after completion of input of all the items of hardware allocation data to the settings screen and receipt of an instruction for saving the hardware allocation data, the tool process unit 201 may compare the hardware allocation data input to the settings screen and the read hardware allocation data, to determine whether there is a change in the hardware allocation data.

After determining no change in the hardware allocation data (No at Step S303), the tool process unit 201 refrains from saving the hardware allocation data in the hardware-allocation-data storage 204. After determining a change in the hardware allocation data (Yes at Step S303), the tool process unit 201 determines whether the hardware allocation data input to the settings screen satisfies the read allocation condition data (Step S304).

In the present embodiment, the allocation condition data contains items such as the number of CPUs for the host OS, the number of CPUs for the guest OS, the number of CPUs for the system, host OS memory, guest OS memory, total memory, built-in LAN port, built-in USB port, PCI expansion slot A, and PCI expansion slot B, as illustrated in Table 1 below.

TABLE 1

|  | Lower limit | Upper limit |
| --- | --- | --- |
| Number of CPUs for the host OS | 2 | 4 |
| Number of CPUs for the guest OS | 0 | 2 |
| Number of CPUs for the system | 2 | 4 |
| Host OS memory (GB) | 4 | 8 |
| Guest OS memory (GB) | 4 | 4 |
| Total memory (GB) | 8 | 8 |
| Built-in LAN port | 0 | 2 |
| Built-in USB port | 0 | 2 |
| PCI Expansion Slot A | 0 | 2 |
| PCI Expansion Slot B | 0 | 2 |
| . . . | | |

The number of CPUs for the host OS represents the upper and lower limits of the number of the CPU cores that are allocable to the host OS 102. The number of CPUs for the guest OS represents the upper and lower limits of the number of the CPU cores that are allocable to the guest OS 105. The number of CPUs for the system represents the upper and lower limits of the sum of the CPU cores that are allocable to the host OS 102 and the guest OS 105.

The host OS memory represents the upper and lower limits of memory capacity that is allocable to the host OS 102. The guest OS memory represents the upper and lower limits of memory capacity that is allocable to the guest OS 105. The total memory represents the upper and lower limits of the sum of memories that are allocable to the host OS 102 and the guest OS 105.

The built-in LAN port represents to which of the host OS 102 or the guest OS 105 the built-in LAN port is allocated. The built-in USB port represents to which of the host OS 102 or the guest OS 105 the built-in USB port is allocated. The PCI expansion slot A represents to which of the host OS 102 or the guest OS 105 the PCI expansion slot A is allocated. The PCI expansion slot B represents to which of the host OS 102 or the guest OS 105 the PCI expansion slot B is allocated. Herein, the number 0 indicates that the hardware 101 (for example, built-in LAN port) is allocated to both the host OS 102 and the guest OS 105. The number 1 indicates that the hardware 101 is allocated to the host OS 102. The number 2 indicates that the hardware 101 is allocated to the guest OS 105.

In the present embodiment, the tool process unit 201 identifies the allocation condition data that corresponds to the item of the hardware allocation data input to the settings screen, from the read allocation condition data. The tool process unit 201 then compares the hardware allocation data input to the settings screen and the identified allocation condition data, to determine whether the input hardware allocation data satisfies allocation conditions.

For example, in response to input of the number of the CPU cores to be allocated to the host OS 102 onto the settings screen, the tool process unit 201 determines whether the input number of the CPU cores satisfies the upper and lower limits of the number of CPUs for the host OS. In response to input of the number of the CPU cores to be allocated to at least one of the host OS 102 and the guest OS 105 onto the settings screen, the tool process unit 201 determines whether the sum of the CPU cores to be allocated to the host OS 102 and the guest OS 105 satisfies the upper and lower limits of the number of CPUs for the system.

After determining that the hardware allocation data input to the settings screen satisfies the allocation condition data (Yes at Step S304), the tool process unit 201 saves the input hardware allocation data in the hardware-allocation-data storage 204 (Step S305). The tool process unit 201 then downloads the hardware allocation data from the hardware-allocation-data storage 204 to the controller 1 in accordance with the user's operation of the tool PC 2.

In the present embodiment, the tool process unit 201 downloads, to the controller 1, the hardware allocation data as configured in Table 2 below. Specifically, the tool process unit 201 downloads items of hardware allocation data (for example, numerical values) to the controller 1, as illustrated in Table 2 below.

TABLE 2

|  | Hardware allocation data |
| --- | --- |
| Number of CPUs for the host OS | 2 |
| Number of CPUs for the guest OS | 0 |
| Host OS memory (GB) | 4 |
| Guest OS memory (GB) | 4 |
| Built-in LAN port | 0 |
| Built-in USB port | 2 |
| PCI Expansion slot A | 1 |
| PCI Expansion slot B | 2 |
| . . . |  |

Meanwhile, after determining that the input hardware allocation data to the settings screen fails to satisfy the allocation condition data (No at Step S304), the tool process unit 201 refrains from saving, in the hardware-allocation-data storage 204, the hardware allocation data input to the settings screen. Furthermore, the tool process unit 201 causes the display 202 to present an error display representing that the input hardware allocation data fails to satisfy the allocation condition data (Step S306).

Figure 4:
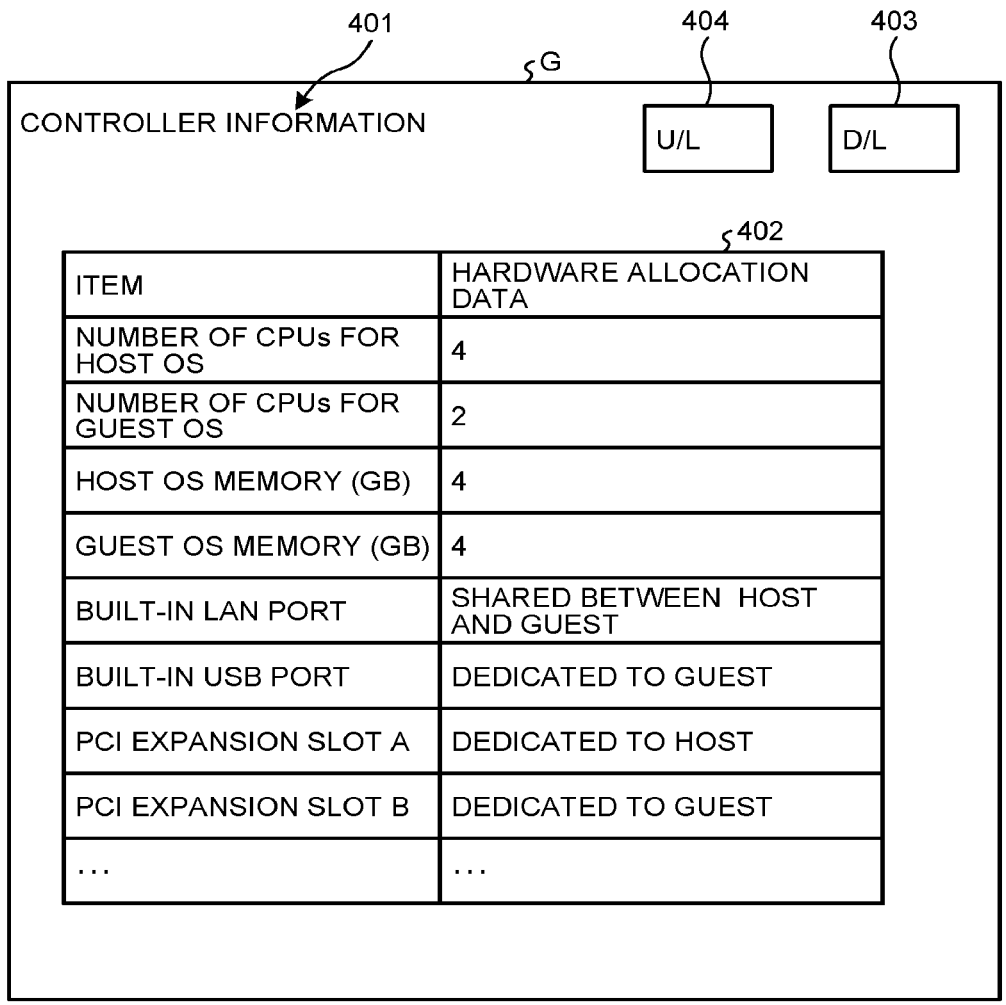
FIG. 4 is a view illustrating an exemplary settings screen displayed on the tool PC in the first embodiment.

FIG. 4 is a view illustrating an exemplary settings screen displayed on the tool PC in the first embodiment. The tool process unit 201 causes the display 202 to display a settings screen G showing controller information 401, a hardware-allocation-data setting field 402, a download button 403, and an upload button 404, as illustrated in FIG. 4. In the present embodiment, the tool process unit 201 causes the display 202 to display the settings screen G for each controller 1, following an instruction from the user (engineer) of the tool PC 2.

The controller information 401 serves to allow the controller 1, serving to change hardware allocation data, to be identifiable, and is exemplified by the model of the controller 1. The download button 403 serves to give an instruction for downloading the hardware allocation data input to the settings screen G to the controller 1. The upload button 404 serves to give an instruction for uploading the hardware allocation data from the controller 1.

The hardware-allocation-data setting field 402 serves as an interface for entering hardware allocation data. Specifically, the hardware-allocation-data setting field 402 displays items of the hardware allocation data (for example, the number of CPUs for host OS, the number of CPUs for guest OS, host OS memory, guest OS memory, built-in LAN port, built-in USB port, PCI expansion slot A, and PCI expansion slot B) and the corresponding hardware allocation data. The hardware-allocation-data setting field 402 displays hardware allocation data (for example, numerical values) input with an operation element of the tool PC 2, and hardware allocation data selected from a pull-down menu displayed on the hardware-allocation-data setting field 402. The pull-down menu in the hardware-allocation-data setting field 402 displays only selectable candidates for hardware allocation data (that is, the hardware allocation data satisfying the allocation condition data). At the time of initial display of the settings screen G (that is, with no hardware allocation data input to the hardware-allocation-data setting field 402), the hardware-allocation-data setting field 402 displays previous values or stored values of the hardware allocation data. Herein, the previous values refer to previously input hardware allocation data. The stored values refer to the hardware allocation data stored in the hardware-allocation-data storage 204 (in other words, the hardware allocation data previously saved in the hardware-allocation-data storage 204).

In the present embodiment, among the items of the hardware allocation data in the hardware-allocation-data setting field 402, the hardware allocation data regarding the built-in LAN port, the built-in USB port, the PCI expansion slot A, and the PCI expansion slot B is input only from the pull-down menu. In the items of the built-in LAN port, the built-in USB port, the PCI expansion slot A, and the PCI expansion slot B, the pull-down menu displays conversion information. The conversion information represents information converted from selectable hardware allocation data candidates to be recognizable to the user of the tool PC 2.

For example, selectable candidates for hardware allocation data for the built-in LAN port may be integers from zero to two. In this case, zero is converted and displayed as "shared between host and guest", one is converted and displayed as "dedicated to host" and two is converted and displayed as "dedicated to guest".

In the present embodiment, the user of the tool PC 2 selects hardware allocation data from the pull-down menus displayed in the hardware-allocation-data setting field 402. However, the present embodiment is not limited thereto. The user of the tool PC 2 may freely enter any hardware allocation data in the hardware-allocation-data setting field 402.

Every time one item of the hardware allocation data is input to the hardware-allocation-data setting field 402, the tool process unit 201 determines whether the input hardware allocation data satisfies the allocation condition data stored in the allocation-condition storage 203. After determining that the input hardware allocation data fails to satisfy the allocation condition data, the tool process unit 201 does not reflect the input hardware allocation data in the hardware-allocation-data setting field 402 and displays previous values or stored values of hardware allocation data in the hardware-allocation-data setting field 402. After determining that the input hardware allocation data satisfies the allocation condition data, the tool process unit 201 displays the input hardware allocation data in the hardware-allocation-data setting field 402.

In the present embodiment, upon every input of one item of the hardware allocation data, the tool process unit 201 determines whether the input hardware allocation data satisfies the allocation condition data. However, the present embodiment is not limited thereto. The tool process unit 201 may determine whether the input hardware allocation data satisfies the allocation conditions after all of the items of the hardware allocation data are input, or upon receiving an instruction for storing the hardware allocation data in the hardware-allocation-data storage 204.

Figure 5:
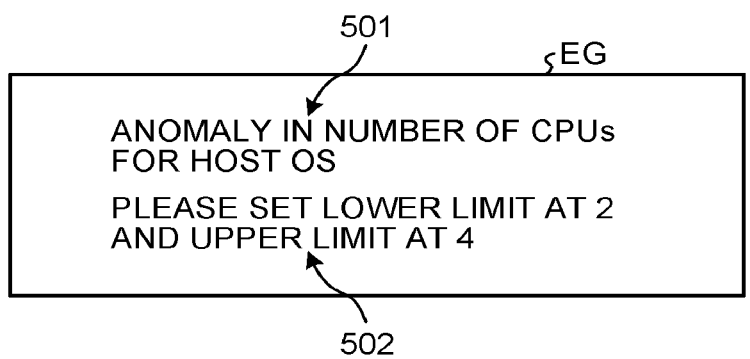
FIG. 5 is a view illustrating an exemplary error display on the tool PC according to the first embodiment.

FIG. 5 is a view illustrating an exemplary error display on the tool PC in the first embodiment. If the input hardware allocation data fails to satisfy the allocation condition data, the tool process unit 201 displays an error display EG on the display 202 as illustrated in FIG. 5. The error display EG includes, among the input items of the hardware allocation data, a name 501 of the item of the hardware allocation data not satisfying the allocation condition data (for example, anomaly in the number of CPUs for the host OS), and allocation condition data 502 of the item concerned.

Figure 6:
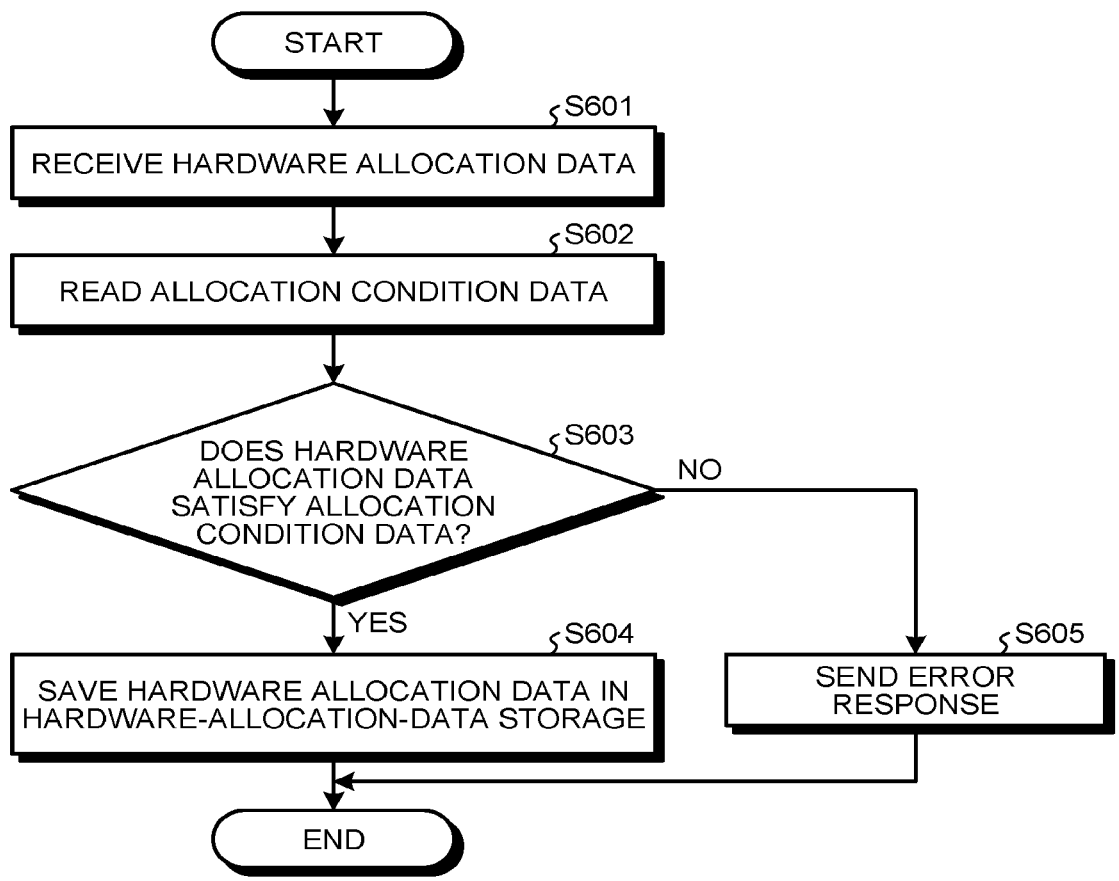
FIG. 6 is a flowchart illustrating exemplary processing of downloading the hardware allocation data onto the controller in the first embodiment.

FIG. 6 is a flowchart illustrating exemplary processing for downloading the hardware allocation data to the controller in the first embodiment. The controller process unit 103*a* of the controller 1 receives downloaded hardware allocation data from the tool PC 2 (Step S601). The controller process unit 103*a* also reads allocation condition data from the allocation-condition storage 101*b* (Step S602).

Subsequently, the controller process unit 103*a* determines whether the downloaded hardware allocation data from the tool PC 2 satisfies the read allocation condition data (Step S603). After determining that the downloaded hardware allocation data satisfies the allocation condition data (Yes at Step S603), the controller process unit 103*a* saves the downloaded hardware allocation data in the hardware-allocation-data storage 101*a* (Step S604).

After determining that the downloaded hardware allocation data fails to satisfy the allocation condition data (No at Step S603), the controller process unit 103*a* refrains from saving the downloaded hardware allocation data in the hardware-allocation-data storage 101*a*. Further, the controller process unit 103*a* transmits an error response to the tool PC 2. The error response serves to notify the user of the fact that the downloaded hardware allocation data is invalid (Step S605). In the present embodiment, when the downloaded hardware allocation data fails to satisfy the allocation condition data, the controller process unit 103*a* transmits an error response to the tool PC 2. However, the controller process unit 103*a* may not transmit an error response to the tool PC 2.

Thus, the control system according to the first embodiment can prevent the hardware 101 from being allocated to the host OS 102 and the guest OS 105 in accordance with erroneous hardware allocation data. This can lower the possibility of exerting undesirable influence on the controller 1.

Second Embodiment

A second embodiment describes an example of displaying on the tool PC the settings screen showing the hardware allocation data uploaded from the controller. In the following, a description of the same or like configurations as those of the first embodiment will be omitted.

Figure 7:
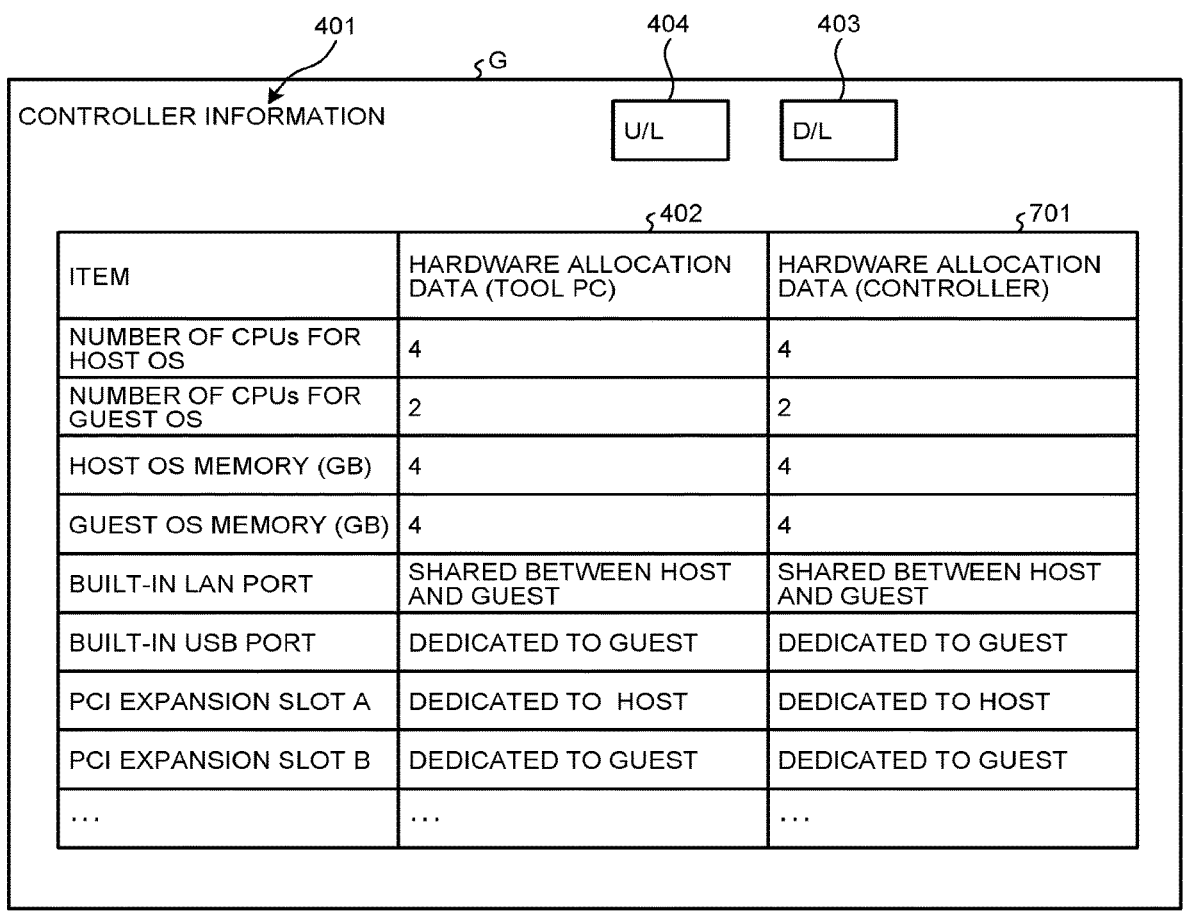
FIG. 7 is a view illustrating an exemplary settings screen displayed on a tool PC according to a second embodiment.

FIG. 7 is a view illustrating an exemplary settings screen displayed on the tool PC in the second embodiment. In the present embodiment, the tool process unit 201 causes the display 202 to display the settings screen presenting the hardware allocation data uploaded from the controller 1. Specifically, the tool process unit 201 causes the display 202 to display the settings screen G including an uploaded hardware-allocation-data field 701, in addition to the controller information 401, the hardware-allocation-data setting field 402, the download button 403, and the upload button 404, as illustrated in FIG. 7. The uploaded hardware-allocation-data field 701 displays each item of uploaded hardware allocation data from the controller 1.

Thus, the control system of the second embodiment allows the user to input the hardware allocation data to the hardware-allocation-data setting field 402 while checking the uploaded hardware allocation data from the controller 1. This can make it easier for the user to change allocation of the hardware 101 to the host OS 102 and the guest OS 105. The hardware allocation data while displayed in the uploaded hardware-allocation-data field 701 is defined to be non-editable.

As described above, according to the first and second embodiments, it is possible to prevent the hardware 101 from being allocated to the host OS 102 and the guest OS 105 in accordance with erroneous hardware allocation data, which can lower the possibility of exerting undesirable influence on the controller 1.

A computer program to be executed by the controller 1 of the embodiments is incorporated in advance into ROM, for example. The computer program to be executed by the controller 1 of the embodiments may be recorded and provided in an installable or executable file format on a computer-readable recording medium, such as a CD-ROM, a flexible disk (FD), a CD-R, or a digital versatile disc (DVD).

Furthermore, the computer program to be executed by the controller 1 of the embodiments may be stored on a computer connected to a network, such as the Internet, and provided by being downloaded via the network. The computer program to be executed by the controller 1 of the embodiments may also be provided or distributed via a network, such as the Internet.

The computer program to be executed by the controller 1 of the embodiments has a module configuration including the respective elements (the host OS 102, the host process group 103, the virtual machine 104, the guest OS 105, and the guest process group 106). The CPU serves as actual hardware to read and execute the computer program from the ROM, thereby loading the respective elements onto the main memory and generating the host OS 102, the host process group 103, the virtual machine 104, the guest OS 105, and the guest process group 106 on the main memory.

While certain embodiments of the present invention have been described, these embodiments have been presented by way of example only, and are not intended to limit the scope of the inventions. These novel embodiments may be embodied in a variety of other forms, and various omissions, substitutions, and changes may be made without departing from the spirit of the inventions. The accompanying claims and their equivalents are intended to cover these embodiments or modifications thereof as would fall within the scope and spirit of the inventions.

The invention claimed is:

1. An engineering tool comprising:
a hardware-allocation-data storage configured to store therein hardware allocation data to be downloaded to a controller, the controller that executes a host operating system, the hardware allocation data representing hardware allocation to each of the host operating system and a guest operating system that runs on a virtual machine implemented on the host operating system;

an allocation-condition storage configured to store therein hardware allocation conditions for the host operating system and the guest operating system; and a tool process unit configured to:
cause a display to display a settings screen for inputting the hardware allocation data,
after determining that the hardware allocation data input to the settings screen satisfies the allocation conditions stored in the allocation-condition storage, save the input hardware allocation data in the hardware-allocation-data storage, and
after determining that the input hardware allocation data fails to satisfy the allocation conditions, refrain from saving the input hardware allocation data in the hardware-allocation-data storage.

2. A controller comprising:
hardware;
a host operating system;
a virtual machine to be implemented on the host operating system;
a guest operating system that runs on the virtual machine;
a hardware-allocation-data storage;
an allocation-condition storage configured to store therein hardware allocation conditions for the host operating system and the guest operating system;
a controller process unit configured to:
receive hardware allocation data from an engineering tool, the hardware allocation data representing the hardware allocation to each of the host operating system and the guest operating system,
after determining that the hardware allocation data satisfies the allocation conditions stored in the allocation-condition storage, save the hardware allocation data in the hardware-allocation-data storage, and
after determining that the hardware allocation data fails to satisfy the allocation conditions, refrain from saving the hardware allocation data in the hardware-allocation-data storage;
a guest process unit configured to:
run by the guest operating system, and
execute control processing to an external, target device, using the hardware allocated to the guest operating system in accordance with the hardware allocation data stored in the hardware-allocation-data storage; and
a host process unit configured to:
run by the host operating system, and
execute control processing to the target device, using the hardware allocated to the host operating system in accordance with the hardware allocation data stored in the hardware-allocation-data storage.

3. A control system comprising an engineering tool and a controller, wherein
the engineering tool comprises:
a tool-side hardware-allocation-data storage configured to store therein hardware allocation data to be downloaded to a controller, the controller that executes a host operating system, the hardware allocation data representing hardware allocation to each of the host operating system and a guest operating system that runs on a virtual machine implemented on the host operating system;

a tool-side allocation-condition storage configured to store therein the hardware allocation conditions for the host operating system and the guest operating system; and a tool process unit configured to:
cause a display to display a settings screen for inputting the hardware allocation data,
after determining that the hardware allocation data input to the settings screen satisfies the allocation conditions stored in the tool-side allocation-condition storage, save the input hardware allocation data in the tool-side hardware-allocation-data storage, and
after determining that the input hardware allocation data fails to satisfy the allocation conditions stored in the tool-side allocation-condition storage, refrain from saving the input hardware allocation data in the tool-side hardware-allocation-data storage, and the controller comprises:
the hardware;
the host operating system;
a virtual machine to be implemented on the host operating system;
the guest operating system that runs on the virtual machine;
a controller-side hardware-allocation-data storage;
a controller-side allocation-condition storage configured to store therein the allocation conditions;
a controller process unit configured to:
receive the hardware allocation data from the engineering tool,
after determining that the received hardware allocation data satisfies the allocation conditions stored in the controller-side allocation-condition storage, save the received hardware allocation data in the controller-side hardware-allocation-data storage, and
after determining that the hardware allocation data fails to satisfy the allocation conditions stored in the controller-side allocation-condition storage, refrain from saving the received hardware allocation data in the controller-side hardware-allocation-data storage;
a guest process unit configured to:
run by the guest operating system, and
execute control processing to an external, target device, using the hardware allocated to the guest operating system in accordance with the hardware allocation data stored in the controller-side hardware-allocation-data storage; and
a host process unit configured to:
run by the host operating system, and
execute control processing to the target device, using the hardware allocated to the host operating system in accordance with the hardware allocation data stored in the controller-side hardware-allocation-data storage.

* * * * *